March 2, 1937.    G. I. RHODES    2,072,314
SAFETY SYSTEM FOR PIPE LINES
Filed Nov. 5, 1936    5 Sheets-Sheet 4
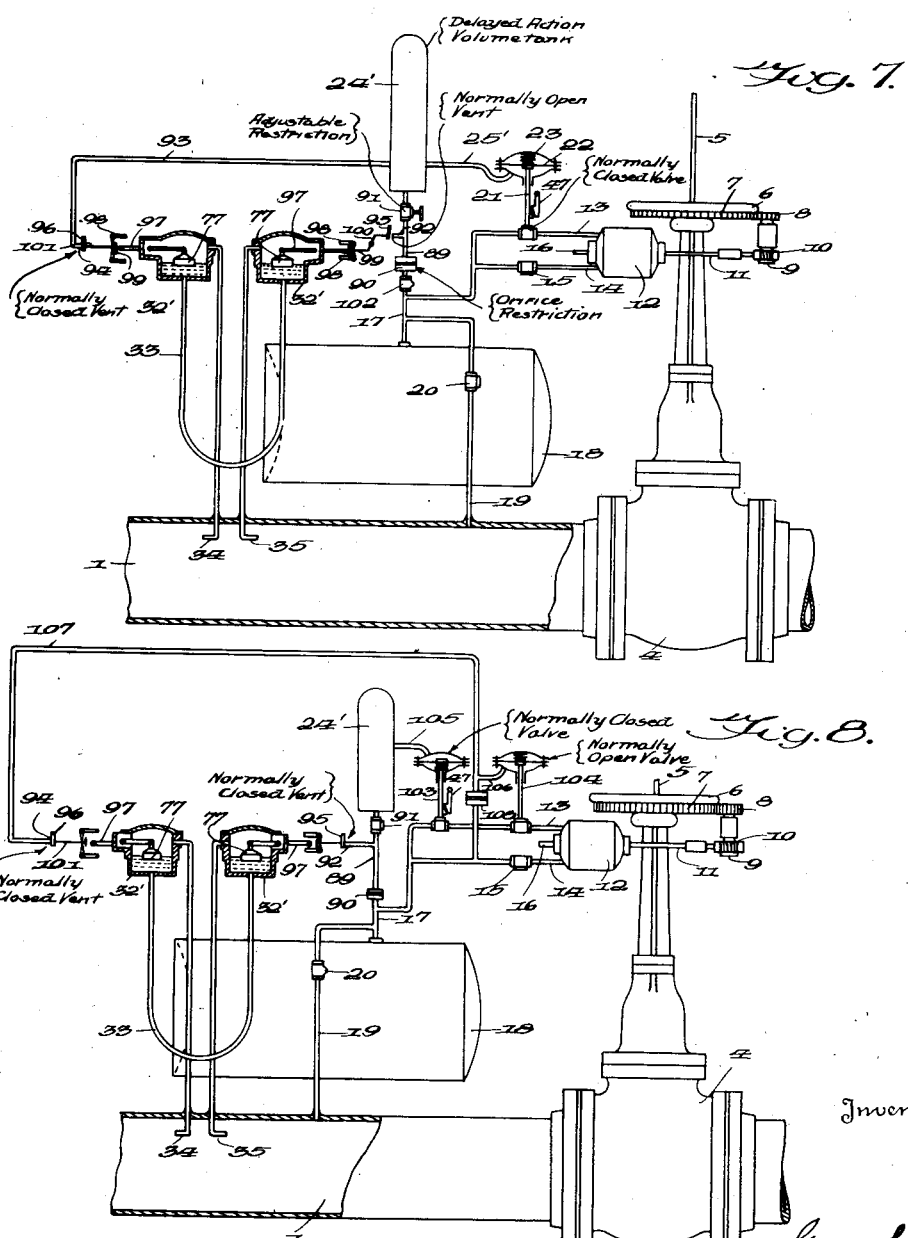

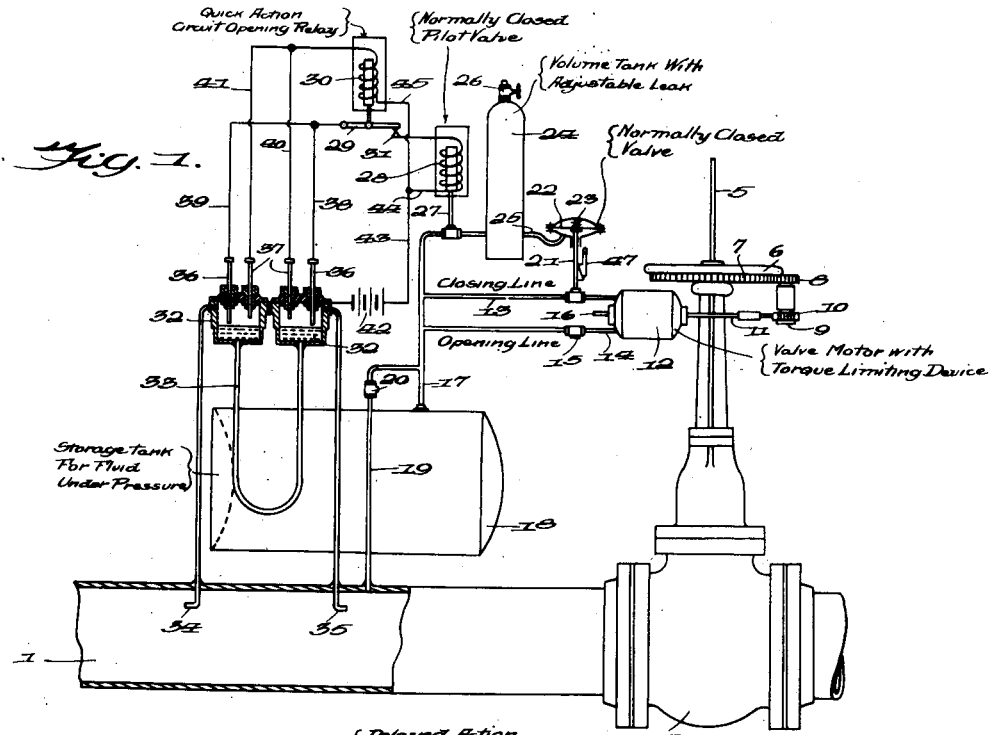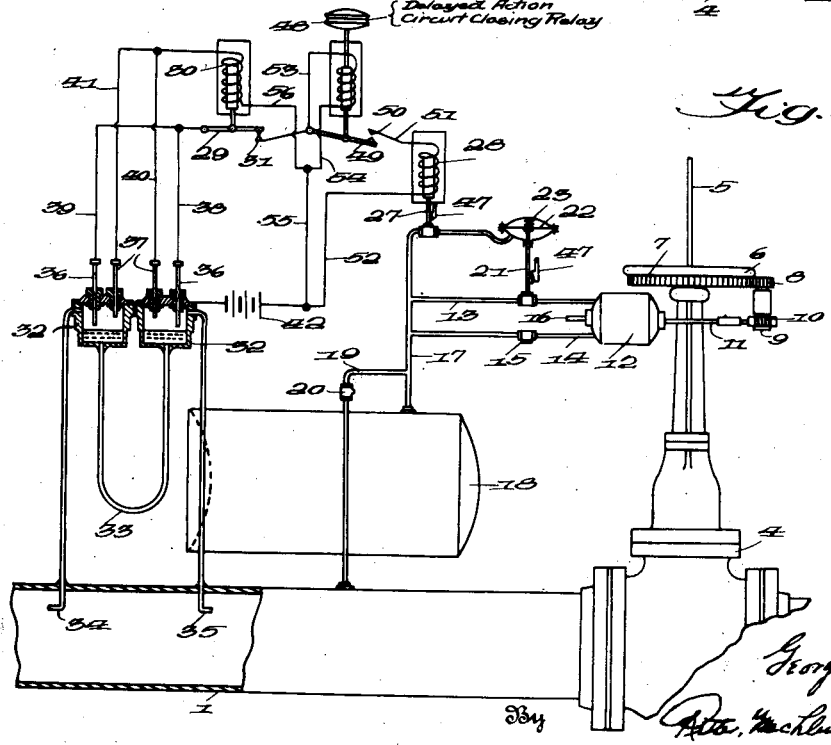

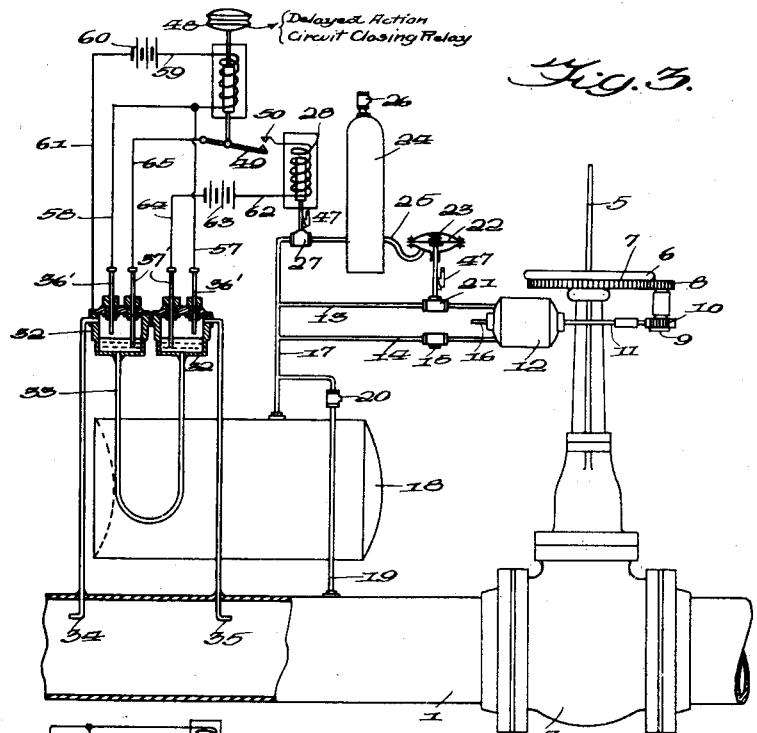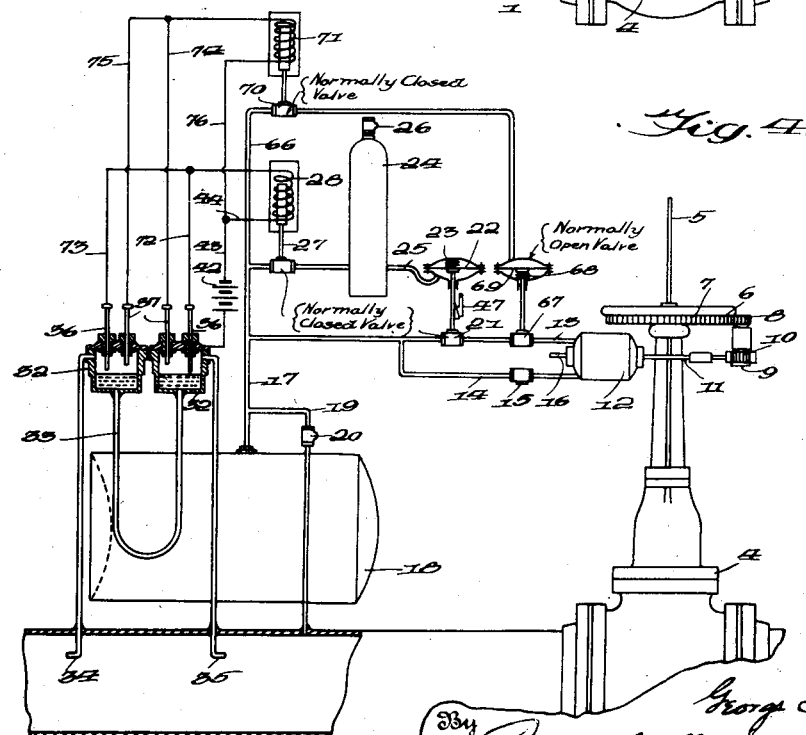

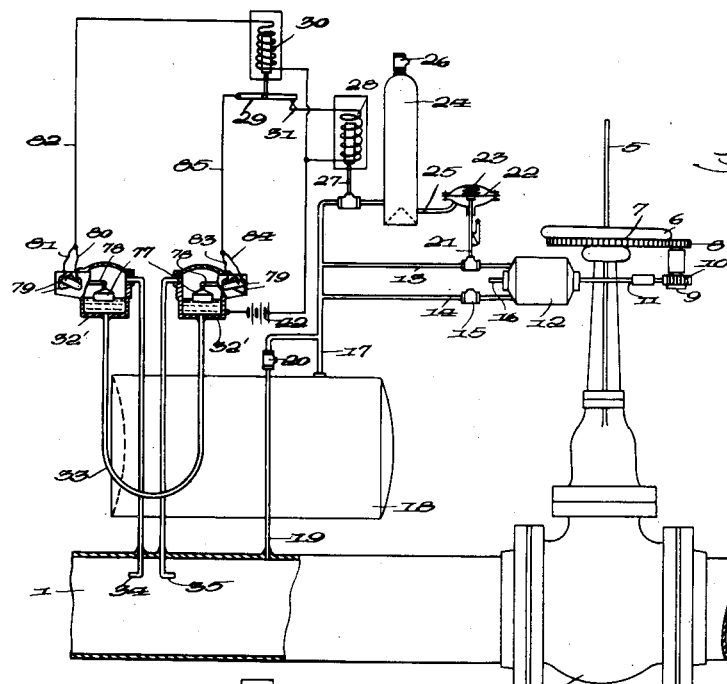

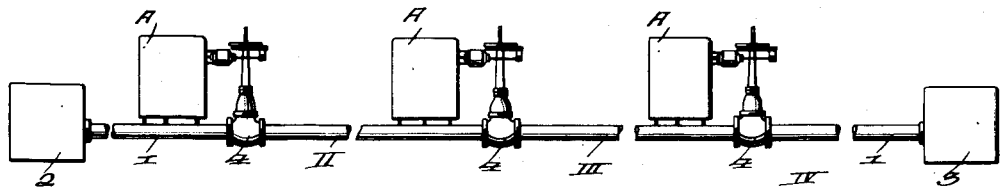
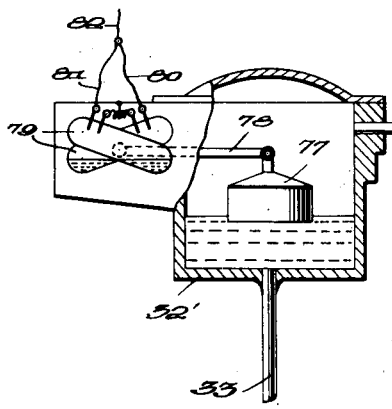
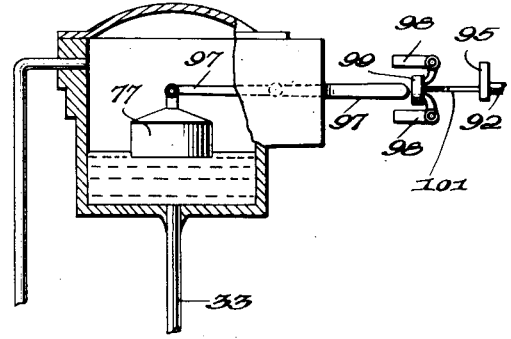
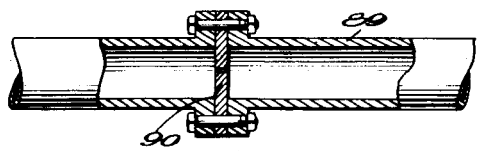

Patented Mar. 2, 1937

2,072,314

UNITED STATES PATENT OFFICE 2,072,314

SAFETY SYSTEM FOR PIPE LINES

George I. Rhodes, Glen Ridge, N. J.

Application November 5, 1936, Serial No. 109,394

18 Claims. (Cl. 137—153)

This invention relates to a safety system for pipe lines conveying fluids under pressure in which the line is divided into isolable sections by cut-off valves located in the line at suitable intervals. The system is particularly applicable to cross-country pipe lines for oil or natural gas.

The primary object of the invention is to stop the escape of the fluid when a break or serious leak in the pipe line occurs by effecting the automatic closure of valves on opposite sides of the break or leak, means being provided for controlling the closing operation of the valves to the end that they may be prevented or restrained from closing until such time as the pressure conditions existing in the pipe line are such that the valves may be safely closed without danger of injuring them.

The principal feature of the invention consists in providing motor means for closing each pipe line valve and in associating therewith mechanism responsive to changes of velocity of the fluid flowing through the pipe line adjacent said valve for inducing a valve closing operation of the motor means, as well as means for suspending the valve closing operation of said mechanism whenever the fluid in the pipe line adjacent the valve is flowing at such an abnormally high velocity as to produce pressure upon the valve rendering it likely that the valve would be damaged if it were then subjected to a closing movement.

Various different embodiments of the invention are illustrated in the accompanying drawings in which:—

Figures 1 to 8 inclusive are side elevations, partly in section, illustrating various embodiments of the invention as applied to the pipe line for conveying an elastic fluid, such as natural gas, Figure 9 is a detail view, partly in elevation and partly in section, of a portion of the differential pressure responsive means embodied in the constructions shown in Figures 5 and 6, Figure 10 is a detail view, partly in section and partly in elevation, illustrating a portion of the pressure responsive means embodied in the constructions shown in Figures 7 and 8, Figure 11 is a detail sectional view, partly in elevation, of an orifice restriction such as is embodied in the constructions shown in Figures 7 and 8, Figure 12 is a diagrammatic view of a pipe line extending from the source of supply to a remote point of delivery.

For many years it has been a common practice to provide pipe lines which convey oil or gas with valves which are spaced at intervals of ten miles more or less so as to divide the line into a series of isolable sections. When a break or serious leak occurs in the pipe line the valves on opposite sides of the break or leak are closed so as to prevent as far as possible the loss of the fluid which the pipe line carries. In ordinary pipe line practice where these valves are operated by hand it never becomes necessary to close a valve against more than a small fraction of normal line pressure, for in the event of a break in the pipe line necessitating closure of valves to stop the flow to the break, several hours usually elapse before the break is discovered and by that time the pipe line has been drained of fluid to such an extent that it is unusual to find more than a small fraction of line pressure acting against the valve. Under such conditions manually operated valves such as are now commonly applied to pipe lines are sufficiently strong to withstand the forces involved. But this condition no longer exists where the closing of valves in the pipe line is by automatically controlled motor means such, for example, as are disclosed in Patent No. 2,041,862 granted to me on May 26th, 1936, and valves that are entirely satisfactory for hand operation would be seriously injured if an attempt were made to close them automatically after the occurrence of a break in the line by any type of motor sufficient for the purpose, since the pressures that build up in the pipe line in the event of a break occurring near one of the valves (say a mile or less away) would be practically full line pressure and the valve stems would buckle before the valves could be closed. By my present invention the weight and strength of pipe line valves that are designed to be operated by automatically controlled motors may be greatly reduced, thus not only decreasing the expense of installation of automatic control in new pipe lines but rendering it economically possible to apply automatic control to existing pipe lines equipped with manually operated valves.

In the drawings the pipe line is indicated at 1. It extends, as diagrammatically illustrated in Figure 12, from a source of supply 2 to a point of delivery 3, which latter may be the market for the fluid or a branch line running from the main line. Between the source of supply 2 and the delivery point 3 the pipe line is divided into a series of isolable sections I, II, III, IV, etc. by cut-off or gate valves 4 which are spaced at intervals of ten miles more or less and which are normally open.

The stem 5 of each main line valve 4 may be provided with a hand wheel 6 permitting its manual operation in the event of failure of the motor which normally operates the valve. Adjacent the hand wheel the valve stem is provided with a large gear wheel 7 which is operatively connected by a pinion 8 and worm wheel 9 with a worm 10 carried by the shaft 11 of a motor 12. This valve motor is equipped with a device to limit the amount of torque applied to the closing of the valve 4 to that torque which will produce forces within the safety limit of the valve itself. Motors with torque limiting devices are well known articles of commerce. In the pneumatic operated motors limitation of the torque is attained by mechanical means controlling the air or gas supply by which the motor is operated; in piston type motors it is attained by limiting the pressure; and in electric motors it is attained by usual overload control of the motor. While, as illustrated in the drawings, it is preferred to employ a pneumatic motor for closing the main line valve 4, since such a motor may be conveniently operated by fluid pressure supplied from the pipe line itself, any suitable motor means may be used if desired.

The valve closing operation of the motor means for actuating the valve 4 is induced by fluid under pressure supplied through a conduit 13. Where a pneumatic motor is employed to effect the closing of the valve 4 the fluid supplied through the conduit 13 acts directly upon the motor 12 to cause it to perform a valve closing movement; and in such case a pipe 14 is preferably also provided for supplying motive fluid to the motor 12 to cause it to effect the opening of the valve 4. A hand operated valve 15 is provided in the pipe 14 for controlling the flow of motive fluid to the pneumatic motor 12. The exhaust for this motor is indicated at 16.

In the embodiment of the invention illustrated in Figure 1 operating fluid is supplied to the conduit 13 and to the pipe 14 by way of a pipe 17 which communicates with a storage tank 18 and which has a branch 19 in open communication with the pipe line 1. The tank 18, being in open communication with the pipe line through the pipes 17 and 19, normally is filled with gas at pipe line pressure. In the pipe 19 is a check valve 20 serving to prevent the flow of gas from the tank back to the pipe line. By this means the storage tank 18 is provided with a reserve supply of fluid pressure for inducing a valve closing operation of the motor 12 should the pressure in the pipe line 1 become too low for that purpose.

Under all usual conditions existing in the pipe line 1 the flow of fluid through the conduit 13 to cause the motor to close the valve 4 is prevented by a normally closed valve 21. This valve is fluid pressure controlled, being preferably provided with a diaphragm 22 which, upon being subjected to sufficient fluid pressure acts to overcome the valve closing spring 23 and thereby cause the valve to open. Fluid pressure for actuating the diaphragm 22 is supplied from the pipe 17 to a tank 24 and passes therefrom to the underside of the diaphragm by way of a pipe 25. The volume tank 24 is provided with an adjustable leak 26 which may be regulated so as to provide that the pressure necessary to actuate the diaphragm 22 for opening the valve 21 shall only be built up in the tank 24 after the lapse of a desired interval of time. The volume tank 24 thus constitutes a means for delaying the opening of the valve 21 after fluid pressure has been admitted to the tank 24 from the pipe 17.

To control the admission of gas to the delayed action tank 24 a valve 27 is located in the pipe 17. This pilot valve is normally closed but is adapted to be moved to open position by a solenoid 28.

In the circuit through which the solenoid 28 is energized to effect the opening of the valve 27 is the armature 29 of a quick action circuit opening electric relay 30, the armature being normally in engagement with a contact member 31 which is connected to the solenoid 28 by a suitable conductor. When the relay 30 is energized its armature 29 is disengaged from the contact member 31 so as to open the circuit containing the solenoid 28. The pilot valve 27 in the pipe 17 is thus permitted to reassume closed position, thereby cutting off the supply of fluid to the delayed action tank 24 and preventing increase of the fluid pressure therein.

The operations both of the solenoid 28 and of the quick action circuit opening relay 30 are controlled by differential pressure responsive means which are under the influence of changes of pressure consequent upon variations in the velocity of the fluid flowing in the pipe line 1, the solenoid being caused to be energized to effect the opening of the pilot valve 27 when the velocity of the fluid flowing in the pipe line adjacent the cut-off valve 4 reaches a predetermined abnormal velocity, and the quick action circuit opening relay 30 being caused to be actuated so as to release the pilot valve from the control of said solenoid when the velocity of the fluid flowing in the pipe line adjacent the valve reaches another predetermined abnormal velocity.

The differential pressure responsive means by which the valve opening solenoid 28 and the circuit opening relay 30 are controlled preferably is of the well known type involving two closed chambers each having metallic walls and each partially filled with mercury. The bottoms of the chambers are connected by a metallic U-tube through which the mercury may be forced from one chamber to the other in response to the predominating pressure prevailing in either chamber. Each chamber is connected above the mercury to a pipe which is in open communication with the pipe line 1 and which terminates in a Pitot tube. These Pitot tubes, 34 and 35 respectively, are so disposed as to communicate to the respective mercury containing chambers 32 the static pressures and the velocity pressures due to the flow of the fluid in either direction through the pipe line 1. Extending through insulating bushings in the top of each chamber 32 are adjustable contact members 36 and 37 respectively. These contacts are so adjusted that they are normally spaced from the adjacent surface of the mercury at such distances that the mercury does not come into contact with the member 36 until abnormal conditions of flow arise in the pipe line 1 and does not come into contact with the member 37 until even more pronounced abnormal conditions of flow exist in the pipe line. The respective adjustable contact members 36 are connected through suitable leads 38 and 39 with the armature 29 of the quick action circuit opening relay 30, while the adjustable contact members 37 are respectively connected to said relay 30 by suitable leads 40 and 41. A battery 42 is employed for energizing both the solenoid 28 and the relay 30, one of its poles being connected to the metallic wall of the adjacent mercury containing chamber 32 and its other pole being connected to the solenoid 28 and the relay 30 through a common lead 43 and the respective conductors 44 and 45 connected thereto.

The operation of the embodiment of the invention illustrated in Figure 1 and heretofore described is as follows: When a break occurs in the pipe line the velocity of the flowing gas is greatly augmented. This results in the development of abnormal pressure conditions in the line. If the break occurs downstream from the valve and comparatively near thereto, say within a mile or less away, the combined action of the lowering of the pressure of the gas downstream from the valve through bleeding to the atmosphere and the increasing of the pressure of the gas upstream from the valve through the tendency to equalize pressures, is sufficient to build up high differential pressures across the valve in the pipe line and, unless the valve is made especially strong and rugged, it is probable that it will be damaged if an attempt is made to close it while such conditions continue. If, however, the break in the pipe line is sufficiently remote from the valve or is of a minor nature the increased velocity of the gas due to its escape from the pipe line may only exceed to a relatively small extent the maximum velocity of flow expected in normal operation of the pipe line, and the differential pressures across the valve produced under such circumstances are not sufficient to cause the valve to be damaged in a closing operation. Assuming the fluid to be flowing in the pipe line from left to right of Figure 1, the occurrence of a break downstream from the valve 4 causes an abnormal increase in the velocity of the fluid flowing in the line with the result that the pressure in the left hand mercury chamber 32 is increased while the pressure in the right hand mercury chamber is decreased. This abnormal change in differential pressure causes the mercury in the right hand chamber 32 to rise and make contact with the lower end of the adjacent contact member 36 thereby closing the circuit from the battery 42 to the metallic wall of the chamber 32, through the mercury and the contact member 36, thence through the lead 38, armature 29 of the relay 30, the contact 31, the solenoid 28 and the conductors 44 and 43 to the battery. Upon the solenoid 28 thus being energized the normally closed valve 27 is opened, thereby permitting gas to flow through the pipes 17 and 19 to the delayed action volume tank 24. Inasmuch as this tank is provided with an adjustable leak 26 the time necessary to build up in it a pressure sufficiently high to cause the normally closed valve 21 in the conduit 13 to be opened may be regulated so as to delay the opening of said valve 21 for any desired interval and thereby correspondingly delay the valve closing operation of the motor 12. This delay in the opening of the valve 21 which controls the flow of fluid through the conduit 13 to the motor affords time for the coming into action of means for suspending the opening of the valve 21 should the velocity of the fluid flowing in the pipe line be so excessive as to render it dangerous to attempt to close the cut-off valve 4 in the pipe line. If, however, the velocity heads which are induced in the pipe line by reason of the break do not exceed a predetermined maximum above which it would be unsafe to close the valve 4, the fluid pressure in the delayed action volume tank 24 ultimately becomes sufficient to overcome the pressure of the spring 23 upon the diaphragm 22, thus opening the valve 21 and permitting gas to flow through the pipes 13, 17 and/or 19 to the motor 12 to cause it to perform a valve closing operation. If the break causes flows of gas of such magnitude that it is unsafe to close the valve 4 in the pipe line the excessive velocity heads which occur will cause the mercury in the right hand chamber 32 to rise to a point enabling it to contact the lower end of the adjacent adjustable contact member 37, whereupon current will flow from the battery 42 through the mercury chamber to the contact member 37, thence through the lead 40 to the quick action circuit opening relay 30 and from thence to the battery through the conductors 45 and 43. Upon the relay being thus energized its armature 29 is disengaged from the contact 31, thus opening the circuit containing the solenoid 28 and thereby permitting the pilot valve 27 to reassume closed position. The closing of the pilot valve shuts off the supply of gas to the delayed action tank 24 and consequently prevents the pressure in said tank from being built up enough to actuate the diaphragm 22 by which the opening of the motor controlling valve 21 is effected. As long as the velocity of flow in the pipe line remains so excessive as to maintain the mercury in engagement with the adjustable contact 37 the pilot valve 27 remains in closed position, and the valve 21 in the conduit 13 consequently remains closed also, with the result that no closing operation of the motor 12 takes place. As soon, however, as the velocity of flow in the pipe line decreases to a point such that the velocity heads occurring therein permit the mercury in the chamber 32 to lower sufficiently to separate from the contact member 37, the circuit containing the quick action circuit opening relay 30 is opened and the armature 29 thereof again assumes its normal position of engagement with the contact 31, thereby permitting the solenoid 28 to be again energized and effect an opening movement of the pilot valve 27. When this occurs fluid is again supplied to the delayed action volume tank 24 and pressure is built up therein, finally becoming sufficient to actuate the diaphragm 22 so as to move the valve 21 to open position and admit motive fluid to the motor 12 through the conduit 13, the valve 4 being consequently moved to closed position.

Whenever the closure of a main line valve 4 approaches completion there is a reduction in flow of the fluid in the pipe line which sooner or later will cause the contact between the mercury in the right hand chamber 32 and the contact member 36 to be opened, thus causing the solenoid controlled pilot valve 27 to close with a resultant closure of the diaphragm controlled valve 21 in the conduit 13 through which motive fluid is supplied for effecting a closing operation of the motor 12. As it requires, in general, about two minutes to close a motor operated main line valve 4 the pressure which is built up in the delayed action tank 24 by the gas flowing from the storage tank 18 into the tank 24 after the valve 21 moves to open position is usually sufficiently greater than that required to overbalance the spring 23 by which the valve 21 is closed, so that even after the pilot valve 27 has closed the pressure in the delayed action tank 24 usually remains sufficiently high to delay the closing of the valve 21 for an interval permitting the motor 12 to close the cut-off valve 4 completely. To guard, however, against the possible contingency that under some condition of operation the valve closing motor 12 will cease to operate before the gate valve 4 in the pipe line is completely closed a simple latch device 47 may be provided for the fluid pressure controlled valve 21 or the solenoid controlled pilot valve 27, whereby when the valve with which the latch is associated having once been opened will remain open by being latched in the latter position. While the use of the latch device involves its manual restoration to operating condition after it has functioned, this is entirely acceptable in practice because the main line valve 4 itself must be opened by manual control whenever it is desired to restore the pipe line to service.

It will be appreciated that if the break in the pipe line occurs upstream with respect to the valve 4 the mode of operation of the devices is the same as that already described, except that the mercury rises in the left hand chamber 32 and cooperates with the adjustable contacts 36 and 37 associated with that chamber, while the mercury falls in the right hand chamber 32 and the adjustable contacts 36 and 37 of the latter chamber do not function.

Another embodiment of the invention is illustrated in Figure 2. It differs from that shown in Figure 1 and heretofore described only in that the means employed for delaying the opening of the valve 21 to admit motive fluid to the motor 12 is a delayed action circuit closing electric relay instead of the pneumatic pressure tank 24. In this form of the safety system a delayed action circuit closing relay 48 is introduced in the electric circuits, the armature 49 of the relay constituting an element of the circuit through which the solenoid 28 is energized to open the pilot valve 27 controlling the flow of gas through the pipe 17 to the diaphragm opened valve 21. The armature 49 is connected to the adjustable contact members 36 through the contact 31, the armature 29 of the quick action relay 30 and through the respective conductors 38 and 39, the armature 29 being normally in engagement with the contact 31. The armature 49 of the delayed action relay is normally out of contact with a cooperating contact 50 which is connected to one terminal of the solenoid by a conductor 51. The other terminal of the solenoid is connected by a conductor 52 to the battery 42, which latter is, as before, electrically connected to the metallic wall of the adjacent mercury chamber 32. One terminal of the coil of the delayed action circuit closing relay 48 is connected to the adjustable contact members 36 of the mercury chambers through a conductor 53, the contact 31, the armature 29 of the quick action circuit opening relay 30 and the respective conductors 38 and 39. The other terminal of the coil of the delayed action circuit closing relay 48 is connected to the battery 42 through conductors 54 and 55, the latter being connected to conductor 52 leading to the battery. In the system shown in Figure 2 latches 47 are respectively provided both for the fluid pressure operated valve 21 and the pilot valve 27 so that when either of these valves has once been opened it will remain latched in open position until manually released.

As the remaining features of construction of the system disclosed in Figure 2 are the same as those heretofore described, they have been identified by corresponding reference numerals.

When the mercury rises in one of the mercury chambers 32 sufficiently high to engage either of the adjustable contact members 36 the circuit including the delayed action circuit closing relay is closed. However, because of the delayed action of the relay 48 the armature 49 thereof does not come into engagement with the contact 50 until after the lapse of a predetermined interval and therefore the circuit including the solenoid 28 is open and the pilot valve 27 remains closed during such interval. This delay in the circuit closing action of the relay 48 is of such duration as to afford time for the mercury to rise and contact with one of the adjustable contact members 37 if the break in the pipe line is such as to induce conditions of flow making it unsafe to close the cut-out valve 4. Upon the mercury coming into contact with either of the adjustable contact members 37 the quick action circuit opening relay is energized to withdraw its armature 29 from engagement with the contact 31, current to energize the relay 30 passing from the battery 42 to the metallic wall of the mercury chamber 32, through the mercury, a contact member 37, through one or the other of the conductors 41, thence through the coil of the quick action circuit opening relay 30, conductors 56, 55 and 52 to the battery. As soon as the armature 29 moves out of engagement with the contact 31 the circuit through which the solenoid 28 effecting an opening of the valve 27 is energized is opened so that the subsequent engagement of the armature 49 of the delayed action circuit closing relay with the contact 50 does not result in energizing the solenoid 28. The valve 27, the opening of which is effected by the solenoid, therefore remains closed and thereby prevents gas from flowing through the pipe 17 to open the valve 21. Since valve 21 remains closed motive fluid cannot pass through the conduit 13 to effect the valve closing operation of the motor 12.

When conditions of flow in the pipe line render it safe to close the gate valve 4 the mercury which has risen in the chamber 32 will have fallen far enough to be free of contact from the adjustable contact member 37 with which it has been in engagement. Thereupon the quick action circuit opening relay 30 will be no longer energized and its armature 29 will move into engagement with the contact 31. As by that time the armature 49 of the delayed action circuit closing relay 48 will have come into engagement with the contact 50, or will ultimately come in engagement therewith, the solenoid 28 will be energized and the pilot valve 27 will therefore be opened to admit fluid beneath the diaphragm 22 of the valve 21, thus causing the valve 21 to open and admit motive fluid through the pipe 13 to the motor 12 to effect a closing of the gate valve 4.

In Figure 3 is illustrated an embodiment of the invention which may be advantageously employed where it is desired to delay the closing of the valve for an unusually long interval after conditions of flow arise in the pipe line dictating such closure. In this form of the invention the time delay pneumatic tank and the delayed action circuit closing electric relay are combined in a single system wherein the electric circuit which controls the pilot valve 27 remains closed during the existence of normal operating conditions in the pipe line but is opened whenever the mercury in either chamber 32 falls below a predetermined level. In this construction the quick action circuit opening relay 30 of the systems illustrated in Figures 1 and 2 is dispensed with and the adjustable contacts 36' and 37', respectively, of each of the chambers 32 are so arranged that the mercury therein does not engage the lower end of either contact member 36' until the velocity of the fluid flowing in the pipe line becomes abnormally high, while each of the contact members 37' normally extends into the mercury of its chamber 32 for a distance such that the mercury loses contact therewith only when it assumes an abnormally low level because of abnormal conditions of flow in the pipe line. In this construction one end of the coil of the delayed action circuit closing relay 48 is connected to the contact members 36' by respective conductors 57 and 58, the other end of the coil of the relay being connected by a conductor 59 to one pole of a battery 60 or other source of electromotive force whose other pole is connected to the metallic wall of one of the mercury containing chambers by a lead 61. The solenoid 28 by which the pilot valve 27 is opened is connected by a conductor 62 to a battery 63 from which a conductor 64 leads to one of the adjustable contacts 37', the other contact member 37' being connected by a lead 65 to the armature 49 of the delayed action circuit closing relay. As in the case of the construction shown in Figure 2 the armature of this relay is normally out of engagement with a contact 50 connected to the solenoid 28 by which the pilot valve 27 is opened, but is adapted to move into engagement with said contact when the delayed action relay is energized. Other features of construction shown in Figure 3 are like those heretofore described and accordingly have been indicated by corresponding reference numerals.

It will be perceived that in the form of the invention disclosed in Figure 3 the mode of operation of the pneumatic means for inducing valve closing operation of the motor 12 is identical with that of the construction shown in Figure 1, and it will also be appreciated that, as in the case of Figure 2, the delayed action circuit closing relay operates to prevent the pilot valve 27 from opening immediately upon the establishment of abnormal conditions in the pipe line causing an excessive increase in the velocity of the fluid flowing therein. It will also be readily understood that whenever the mercury in either chamber falls below a predetermined level due to excessive flow of gas in the pipe line I the circuit through which the solenoid 28 is energized is opened between the mercury in that chamber and the adjacent contact member 37, thereby making it impossible for the solenoid to open the pilot valve 27 to admit fluid to the delayed action volume tank 24.

Figure 4 illustrates a form of the safety system which substantially differs from that shown in Figure 1 only in that a valve is employed to prevent the motor 12 from operating to close the gate valve 4 when conditions of flow in the pipe line render it unsafe to do so, whereas in the construction shown in Figure 1 the motor is prevented from operating under such conditions by the solenoid controlled pilot valve 27. In this embodiment of the invention the pipe 17 is provided with an extension 66 for permitting flow of gas under pressure to control the position of a valve 67 located in the conduit 13 through which motive fluid is supplied to the motor 12 to effect a valve closing operation of the latter, the valve 67 being disposed between the motor and the valve 21. The valve 67 is normally held open by a spring 68 and is adapted to be closed by fluid pressure supplied to its diaphragm 69 through the pipe 66. The flow of fluid through this pipe is controlled by a normally closed valve 70 which is adapted to be opened by a solenoid 71. The relationship of the adjustable contact members 36 and 37 to the mercury in the chambers 32 is the same as heretofore described in respect to Figure 1. Those contact members 36 whose lower ends are normally nearer the surface of the mercury are respectively connected by conductors 72 and 73 to one end of the solenoid 28 by which the pilot valve 27 is opened to admit fluid pressure to the delayed action tank 24, while the other end of the solenoid is connected to the battery 42 by conductors 43 and 44, the battery itself being electrically connected to the wall of one of the chambers 32. The circuit of the solenoid 71 for controlling the operation of the valve 70 is like that of the quick action circuit opening relay 30 of the system illustrated in Figure 1; that is to say, conductors 74 and 75 connect the respective adjustable contacts 37 to one end of the solenoid 71 by which the valve 70 in the pipe 66 is opened. The other end of the solenoid 71 is connected to the battery 42 by a conductor 76 and the conductor 43. The remaining features of construction of the embodiment of the invention shown in Figure 4 are the same in form and function as details heretofore described and accordingly have been indicated by corresponding reference numerals. In this form of construction when the mercury in either of the chambers 32 rises sufficiently to make contact with one of the adjustable contact members 37 the solenoid 71 is energized to cause the valve 70 in the pipe 66 to open, thereby permitting fluid to flow through said pipe and act upon the diaphragm 69 of the valve 67 so as to close the latter. The closing of this valve 67 prevents motive fluid from reaching the motor 12 through the conduit 13 even though the valve 21 may be open and hence the motor 12 cannot operate to close the gate valve 4 in the pipe line. When conditions of flow in the pipe line reach a point where the flow is not so excessive as to render it unsafe to close the gate valve 4 the mercury will no longer be in engagement with the contact member 37 and the circuit to the solenoid 71 will be open, thereby permitting the valve 70 in the pipe 66 to reassume closed position and consequently permitting the valve 67 to reassume open position.

Figure 5 illustrates a form of the safety system which is identical with that shown in Figure 1 except that it employs mercury switches (known in the trade as "mercoid" switches) instead of internal electrical contacts in the mercury chambers. In this construction each mercury chamber 32' (see Figure 9) has within it a float 77 which is connected to a bell crank lever 78 having a shaft which extends through the chamber wall and which has mounted upon it a plurality of mercury switches 79. The construction and mode of operation of this form of float operated mercury switch device being well known need not be further described. The mercury switches associated with one of the float chambers are respectively connected by conductors 80 and 81 and a common conductor 82 with the quick action circuit opening relay 30, while the mercury switches associated with the other float chamber are respectively connected by conductors 83 and 84 and a common conductor 85 with the armature 29 of said relay. Under normal conditions of flow in the pipe line the floats 77 occupy positions such that current does not flow through the mercury switches. When, however, the switches, which are mounted on the shafts of the bell crank levers 78, tilt one way or the other as the mercury rises or falls the circuits controlled by said switches are closed. The adjustment of the angle of these mercoid switches accomplishes the same purpose as the adjustment of the elevation of the adjustable contacts 36 and 37 of the construction shown in Figure 1.

Mercury switches controlled by floats are also employed in the specific embodiment of the invention illustrated in Figure 6. Except for the use of mercury switches, instead of electrical contacts in the mercury chambers 32', this modification of the invention is identical with that shown in Figure 4 and, therefore, like features of construction have been identified by corresponding reference numerals. Likewise, the float and mercury switch devices, being similar to those shown in Figure 5, have been indicated by reference numerals corresponding to those heretofore used to identify like parts. As shown, the mercury switches associated with one of the float chambers 32' are connected to the solenoid 71 by which valve 70 is actuated by the respective conductors 83 and 84 and a common conductor 85, the said solenoid being connected to the battery 42 through the conductors 76 and 43. The mercoid switches 79 associated with the other mercury containing chamber 32' are connected to one end of the solenoid 28 by the respective conductors 86 and 87 and a conductor 88, while the other end of said solenoid 28 is connected to the battery 42 by conductors 43 and 44.

The modification of the invention illustrated in Figure 7 provides wholly pneumatic means for controlling the motor by which the gate valve 4 is closed. This is accomplished by employing a well known method of valve control which is so introduced into the system as to control the pressure built up in the delayed action volume tank and thereby govern the valve closing operation of the motor 12. In this form of construction, like that shown in Figure 1, the diaphragm opened spring closed valve 21 in the conduit 13 for supplying the motor 12 with motive fluid is normally closed. It is connected to the delayed action volume tank 24' by a pipe 25' which enables the fluid pressure in the tank to be communicated to the underside of the diaphragm 22 by which the valve 21 is opened against the pressure of the spring 23. The tank 24' preferably is unprovided with any adjustable leak such as that indicated at 26 in the system shown in Figure 1.

Opening into the tank 24' is a pipe 89 which communicates with the storage tank 18 and the pipe line 1 through the pipes 17 and 19, respectively. The pipe 89 is provided with restrictions 90 and 91, respectively, and between said restrictions is formed with a vent 92 which is normally open to the atmosphere. The restriction 90 is preferably an orifice restriction of well known form such as is shown in Figure 11 and the restriction 91 is preferably adjustable. By a proper choice of dimensions of the tank 24' and the orifices or restrictions 90 and 91, respectively, a time delay of any desired magnitude may be secured, it being understood that the orifice restrictions are so proportioned that their resistance to the flow of gas when the vent 92 in the pipe 89 is open is such that the pressure that will be built up in the tank 24' is too low to cause the opening of the diaphragm opened valve 21 in the conduit 13. A pipe 93 which communicates with the tank 24' is provided at its outer end with a vent 94 through which the pressure in the tank 24' may exhaust to the atmosphere. The escape of fluid through the vent 92, which is normally open, is controlled by a movable flap or plate 95 in front of said vent, while the escape of fluid through the vent 94, which is normally closed, is controlled by a similar flap or plate 96. These vent controlling flaps 95 and 96 are respectively actuated by floats 77 in mercury containing chambers 32' having a U-tube connection 33 and Pitot tubes 34 and 35 communicating with the pipe line, such details of construction being similar to those embodied in the system illustrated in Figure 5.

The float 77 in the right hand chamber is connected to a lever 97 which is pivoted or fulcrumed upon and extends through the wall of said chamber. The outer end of this lever extends between and is adapted to move into contact with either of two small separately supported bell crank levers 98 (see Figure 10) when the corresponding float 77 rises or falls to a predetermined position. The adjacent or inner arms of the bell crank levers 8 cooperate with a disk 99 which is connected by a link and lever device 100 with the flap 95 which stands in front of the vent 92. Whenever the height of the mercury in the right hand chamber 32' rises or falls to a predetermined position corresponding to a velocity of flow of gas requiring the closure of the gate valve 4 in the pipe line the lever 97 comes into engagement with one of the bell crank levers 98 and the flap 95 in front of the normally open vent 92 will thereupon close that vent. The mechanism by which the float 77 in the left hand chamber 32 controls the movement of the flap 96 which normally closes the vent 94 is generally similar to the mechanism just described for controlling the movement of the flap 95; that is to say, the float connected lever 97, bell crank levers 98 and cooperating disk 99 are employed, but instead of said disk being connected to the flap 96 through a lever and link mechanism it is directly connected thereto by a bar or rod 101. Whenever the mercury in the left hand chamber rises or falls to a predetermined position corresponding to a velocity of flow of gas in the pipe line rendering it unsafe to effect closure of the gate valve 4 one or the other of the bell crank levers 98 associated with the flap 96 presses against the disk 99 and moves the flap 96 away from the vent 94, thereby permitting the fluid in the tank 24' to exhaust to the atmosphere through the pipe 93.

The safety system illustrated in Figure 7 operates in the following manner: Under normal operating conditions in the pipe line 1 the vent 92 in the pipe 89 leading to the tank 24 is open while the vent 94 in the pipe 93 communicating with said tank is closed by the flap 96. Due to the resistance to flow caused by the orifice restriction 90 the pressure that will normally be built up in the tank 24' is not sufficiently high to effect an opening movement of the valve 21 and consequently the motor 12 will remain inoperative. When, however, an abnormal condition of flow arises in the pipe line 1 sufficient to enable the flap 95 to close the vent 92 in the pipe 89 pressure is built up in the tank 24' at a time rate dependent upon the size of the orifice restriction 90 and the adjustment of the adjustable restriction 91. When the pressure in the tank 24' rises to that required to operate the diaphragm 22 and thus open the valve 21 gas under pressure will be supplied to the motor 12 to cause it to move the main line valve 4 to closed position. If the flow of gas in the pipe line causes an excessive differential pressure in the chambers 32' containing the mercury the left hand float will cause the normally closed vent 94 in the pipe 93 to open, thereby venting the tank 24' to the atmosphere. Obviously when the flap 96 is in such a position that the pipe 93 is open to the atmosphere it is impossible for pressures to build up in the tank 24' high enough to cause the opening of the valve 21 controlling the operation of the motor 12. When conditions in the pipe line 1 become such that the flap 96 again closes the vent 94 in the pipe 93 while the flap 95 still closes the vent 92 in the pipe 89, pressure builds up in the tank 24' sufficient to cause an opening of the valve 21. As soon as the valve 21 opens gas under pressure flows through the conduit 13 to actuate the motor 12 and close the gate valve 4 in the pipe line. It will thus be seen that this embodiment of the invention provides wholly pneumatic means of control for safely closing the gate valve 4 when a break occurs in the pipe line.

In order to minimize the amount of gas escaping through the normally open vent 92 and to permit the use of larger, safer vents, the pressure of the gas supplied to the pipe 89 from the pipe 17 is preferably reduced to fifteen pounds or less per square inch by means of a reducing valve 102 which is introduced between the source of gas supply and the orifice restriction 90. While a latch device 47 may be employed for retaining the valve 21 in open position after it has been opened, it can be entirely dispensed with whenever sufficient time delay is introduced into the pneumatic circuits to insure a delay in the closure of the diaphragm operated valve 21 sufficient to enable the motor 12 to close the gate valve 4 after the velocity of the gas in the pipe line has fallen to such an extent as to open the vent 92, for it will be appreciated that if the time delay in effecting closure of the valve 21 after the velocity of the gas has thus fallen is made substantially equal to the time required to close the gate valve 4 then the gate valve, once having started to close, will be completely closed. It is obvious also that by similarly introducing sufficient time delay in their pneumatic circuits the latch devices 47 of the embodiments of the safety system illustrated in Figures 1, 3, 4, 5 and 6 may be dispensed with.

Another modified form of the invention in which the valve closing operation of the motor 12 is wholly controlled by pneumatic means is illustrated in Figure 8. This embodiment of the invention differs from that shown in Figure 7 and already described in that the vents 92 and 94 are normally closed, thus avoiding the continuous loss of gas, and in that an additional valve in the conduit 13 is employed to prevent motive fluid from reaching the motor 12 when conditions of flow in the pipe line 1 are such that it would be unsafe to close the gate valve 4. As shown in Figure 8 the conduit 13 is provided with a diaphragm closed, spring opened valve 103 and with a diaphragm opened spring closed valve 104. The valve 103 is normally closed while the valve 104 is normally open. A pipe 105 permits gas pressure in the tank 24' to act upon the upper side of the diaphragm of the valve 103 so as to maintain said valve closed. Communicating with the normally closed valve 104 beneath its diaphragm is a pipe 106 forming a branch of a pipe 107 which terminates in the atmospheric vent 94.

This pipe 107 communicates through the pipes 16, 17 and 19 with the storage tank 18 and the pipe line 1. Disposed in the pipe 107 is an orifice restriction 108 through which the gas is required to pass before reaching the branch pipe 106. This orifice restriction may be of the same character as the orifice restriction 90 in the pipe 89. The remainder of the mechanism is identical in form and function with that illustrated in Figure 7, except that the reducing valve 102 in the pipe 89 is omitted and both of the flaps 95 and 96 for cooperating with the respective vents 92 and 94 are actuated by identical devices corresponding to those shown in Figure 7 as associated with the flap 96. Accordingly like reference numerals have been employed to identify corresponding details of construction in Figures 7 and 8.

The operation of the safety system shown in Figure 8 will be readily understood. As the vent 92 in the pipe 89 by which gas is supplied to the tank 24' is normally closed, the pressure in the tank is normally sufficient to compel the valve 103 to remain closed against the action of the spring by which it is opened. When the flap or plate 95 is actuated by the float 77 in the right hand chamber 32' so as to open the vent 92, gas is permitted to bleed from the delayed action tank 24' at a rate which is dependent upon the size of the orifice restriction 90 and the adjustment of the adjustable restriction 91. Upon the pressure in this tank falling a predetermined amount the consequent reduction in pressure above the diaphragm of the valve 103 permits the spring against which the diaphragm acts to open said valve, thereby allowing motive fluid to be supplied to the motor 12 through the conduit 13 and thus enabling the motor to close the gate valve 4 in the pipe line. So long as the flap 96 continues to close the vent 94 in the pipe 107 the pressure upon the under side of the diaphragm of the valve 104 is sufficient to hold that valve open against the pressure of the spring tending to close it. When, however, as the result of excessive conditions of flow in the pipe line 1 the float 77 in the left hand chamber 32' actuates the flap 96 to open the vent 94 to the atmosphere, the orifice restriction 108 in the pipe 107 introduces so much pressure drop in the flow of gas therethrough that the pressure acting through the branch pipe 106 beneath the diaphragm of the valve 104 is insufficient to hold that valve open against the closing pressure of the spring associated therewith and consequently the spring causes the valve 104 to close, thereby shutting off the supply of gas through the conduit 13 to the motor 12. When due to changed conditions of flow in the pipe line the vent 94 in the pipe 107 is again closed by the flap 96 the valve 104 will again open so as to permit gas to be supplied through the pipe 13 to the motor 12 to cause the latter to effect a closing movement of the gate valve 4.

It is believed that the several embodiments of the invention which have been disclosed exemplify the safety system for pipe lines so thoroughly that it may be applied by such combinations of contacts, relays and time delays as may be considered desirable in any particular installation.

Having thus described the invention, what is claimed is:

1. A safety system for pipe lines involving a valve in the pipe line for controlling the flow of fluid therethrough, means for closing said valve, fluid pressure actuated means responsive to changes of velocity of the fluid flowing through the pipe line adjacent said valve, mechanism controlled by said fluid pressure actuated means for inducing a valve closing movement of said valve closing means, said mechanism including means for delaying the completion of its operation for inducing said closing movement, and means controlled by said fluid pressure actuated means for suspending the operation of said mechanism when the velocity of the fluid flowing in the pipe line exceeds a predetermined maximum.

2. A safety system for pipe lines involving a normally open valve in the pipe line for controlling the flow of fluid therethrough, means for closing said valve, fluid pressure controlled means responsive to changes in differential pressure induced by predetermined variations in the velocity of the fluid flowing through the pipe line, said fluid pressure controlled means including a plurality of liquid containing chambers respectively communicating with said pipe line and having a U-tube connection between them, mechanism controlled by said fluid pressure controlled means for inducing a valve closing movement of said valve closing means, said mechanism including means for delaying the completion of its operation for inducing said closing movement, and means responsive to said fluid pressure controlled means for suspending the operation of said mechanism when the fluid flowing in the pipe line attains a predetermined velocity.

3. A safety system for pipe lines involving a valve in the pipe line for controlling the flow of fluid therethrough, means for closing said valve, mechanism responsive to changes of velocity of the fluid flowing through the pipe line adjacent said valve for inducing a valve closing movement of said valve closing means, said mechanism including means for delaying the completion of its operation for inducing said valve closing movement, and means for suspending the valve closing operation of said mechanism when the velocity of the fluid flowing in the pipe line adjacent said valve exceeds a predetermined maximum.

4. A safety system for pipe lines involving a valve in the pipe line for controlling the flow of fluid therethrough, means for closing said valve, differential pressure responsive means including a plurality of liquid containing chambers respectively communicating with said pipe line and having a U-tube connection between them, mechanism controlled by said differential pressure responsive means for inducing a valve closing operation of said valve closing means when the fluid flowing in the pipe line adjacent said valve reaches a predetermined velocity, said mechanism including a fluid pressure actuated valve controlling the valve closing operation of said valve closing means and also including means for delaying movement of said fluid pressure actuated valve to a position enabling said valve closing means to close the valve in the pipe line, and means controlled by said differential pressure responsive means for preventing said mechanism from inducing a valve closing operation of said valve closing means when the velocity of the fluid flowing in the pipe line adjacent said valve therein exceeds a predetermined maximum.

5. A safety system for pipe lines involving a normally open valve in the pipe line for controlling the flow of fluid therethrough, a fluid pressure operated motor for closing said valve, a conduit for supplying motive fluid to said motor to effect a valve closing operation thereof, a normally closed fluid pressure controlled valve in said conduit, means affording a passage for supplying fluid to effect the opening of said normally closed valve, said passage means including a tank device, a normally closed valve controlling the flow of fluid to said tank device, said tank device acting after said last named valve is opened to delay the opening of said fluid pressure controlled valve, differential pressure responsive means including a plurality of liquid containing chambers having a U-tube connection between them and respectively communicating with said pipe line, electrically operated means for opening said valve controlling the flow of fluid to said tank device, said electrically operated means being included in an electric circuit involving means effective to close said circuit upon occurrence of a predetermined difference of level of the liquid in said chambers, and means effective to open said circuit when the difference in level of the liquid in said chambers increases a further predetermined amount.

6. A safety system for pipe lines involving a normally open valve in the pipe line for controlling the flow of fluid therethrough, a motor for closing said valve, a conduit for supplying fluid to induce a valve closing operation of said motor, a normally closed fluid pressure controlled valve in said conduit, means affording a passage for supplying fluid to effect the opening of said normally closed valve, said passage means including a tank device, a valve in said passage normally preventing the flow of fluid to said tank device, said tank device acting after said last named valve is opened to delay the opening of said fluid pressure controlled valve, electrically operated means for opening said last named valve, a delayed action circuit closing electric relay controlling the operation of said electrically operated means, differential pressure responsive means including a plurality of liquid containing chambers having a U-tube connection between them and respectively communicating with said pipe line, means effective to close the circuit containing said relay upon the occurrence of a predetermined difference of level of the liquid in said chambers, and means effective to open the circuit containing said electrically operated means when the difference of level of the liquid in said chambers has increased a further predetermined amount.

7. A safety system for pipe lines involving a normally open valve in the pipe line for controlling the flow of fluid therethrough, motor means for closing said valve, a conduit for supplying fluid to induce a valve closing operation of said motor means, a normally closed fluid pressure controlled valve in said conduit, means affording a passage for supplying fluid to effect the opening of said normally closed valve, a valve normally preventing the flow of fluid through said passage, electrically operated means for opening said last named valve, a delayed action circuit closing electric relay for closing the circuit containing said electrically operated means, differential pressure responsive means including a plurality of liquid containing chambers having a U-tube connection between them and respectively communicating with said pipe line, means effective to close the circuit containing said relay upon the establishment of a predetermined difference of level of the liquid in said chambers, and means effective to open the circuit containing said electrically operated means when the difference of level of the liquid in said chambers has increased a further predetermined amount.

8. A safety system for pipe lines involving a valve in the pipe line for controlling the flow of fluid therethrough, a fluid pressure operated motor for closing said valve, a conduit for supplying motive fluid to said motor to effect a valve closing operation thereof, a normally closed fluid pressure controlled valve in said conduit, a normally open fluid pressure controlled valve in said conduit, means affording a passage for supplying fluid to effect the opening of said normally closed valve, said passage means including a tank device, a normally closed valve controlling the flow of fluid to said tank device, said tank device acting after said last named valve is opened to delay the opening of said normally closed fluid pressure controlled valve, piping for supplying fluid to effect the closing of said normally open fluid pressure controlled valve, a normally closed valve in said piping controlling the flow of fluid to said normally open fluid pressure controlled valve, differential pressure responsive means including a plurality of liquid containing chambers having a U-tube connection between them and respectively communicating with said pipe line, electrically operated means responsive to a predetermined difference of level of the liquid in said chambers for opening said valve controlling the flow of fluid to said tank device, and electrically energizable means responsive to a greater predetermined difference of level of the liquid in said chambers for opening said normally closed valve in said piping.

9. A safety system for pipe lines involving a valve in the pipe line for controlling the flow of fluid therethrough, a motor for closing said valve, a conduit for supplying fluid to induce a valve closing operation of said motor, a normally closed fluid pressure controlled valve in said conduit, a normally open fluid pressure controlled valve in said conduit, differential pressure responsive means including a plurality of liquid containing chambers having a U-tube connection between them and respectively communicating with said pipe line, means affording a passage permitting a flow of fluid to control the operation of said normally closed valve, means responsive to a predetermined difference of level of the liquid in said chambers for causing a flow of fluid through said passage to enable said normally closed valve to open, means affording a passage permitting a flow of fluid to control the operation of said normally open valve, and means responsive to a greater predetermined difference of level of the liquid in said chambers for causing a flow of fluid through said last named passage to enable said normally open valve to close.

10. A safety system for pipe lines involving a valve in the pipe line for controlling the flow of fluid therethrough, means for closing said valve, a conduit for supplying fluid to induce a valve closing operation of said valve closing means, a normally closed fluid pressure controlled valve in said conduit, differential pressure responsive means including a plurality of liquid containing chambers having a U-tube connection between them and respectively communicating with said pipe line, means affording a passage permitting a flow of fluid to control the operation of said normally closed valve, said passage means including a tank device and having a vent therein and being provided with restrictions on opposite sides of said vent, one of said restrictions being disposed between said tank device and said vent, means actuated by said differential pressure responsive means for controlling the flow of fluid through said vent, and means effective to prevent a valve closing operation of said valve in the pipe line when the liquid in said chambers attains a predetermined difference of level, said last named means including a fluid receiving conduit having an exhaust port and also including means actuated by said differential pressure responsive means for controlling the flow of fluid through said exhaust port.

11. A safety system for pipe lines involving a normally open valve in the pipe line for controlling the flow of fluid therethrough, a motor for closing said valve, a conduit for supplying fluid to induce a valve closing operation of said motor, a normally closed valve in said conduit, differential pressure responsive means including a plurality of liquid containing chambers having a U-tube connection between them and respectively communicating with said pipe line, means controlled by said differential pressure responsive means adapted to cause said normally closed valve to open when the fluid flowing in the pipe line adjacent said normally open valve reaches a predetermined velocity, and means controlled by said differential pressure responsive means acting to prevent the opening of said normally closed valve when the velocity of the fluid flowing in the pipe line adjacent said normally open valve exceeds to a predetermined extent said predetermined velocity.

12. A safety system for pipe lines involving a normally open valve in the pipe line for controlling the flow of fluid therethrough, a fluid pressure operated motor for closing said valve, a conduit for supplying motive fluid to said motor to effect a valve closing operation thereof, a normally closed fluid pressure controlled valve in said conduit, means affording a passage for supplying fluid to effect the opening of said normally closed valve, a valve normally preventing the flow of fluid through said passage, a solenoid for opening said last named valve, means for latching said last named valve in open position, a delayed action circuit closing electric relay for closing the circuit containing said solenoid, differential pressure responsive means including a plurality of liquid containing chambers having a U-tube connection between them and respectively communicating with said pipe line, means effective to close the circuit containing said relay upon the establishment of a predetermined difference of level of the liquid in said chambers, and means effective to open the circuit containing said solenoid when the difference of level of the liquid in said chambers has increased a further predetermined amount.

13. A safety system for pipe lines involving a normally open valve in the pipe line for controlling the flow of fluid therethrough, a motor for closing said valve, a conduit for supplying fluid to induce a valve closing operation of said motor, a normally closed fluid pressure controlled valve in said conduit, means affording a passage for supplying fluid to effect the opening of said normally closed valve, said passage means including a tank having an escape vent, a valve in said passage normally preventing the flow of fluid to said tank, a solenoid for inducing the opening of said last named valve, said tank acting after the opening of the valve in said passage to delay the opening of said fluid pressure controlled valve, means for latching said fluid pressure controlled valve in open position, a delayed action circuit closing electric relay for closing the circuit containing said solenoid, differential pressure responsive means including a plurality of liquid containing chambers having a U-tube connection between them and respectively communicating with said pipe line, means effective to close the circuit containing said relay when the liquid in said chambers attains a predetermined difference of level, and means effective to open the circuit containing said solenoid when the difference of level of the liquid in said chambers has further increased a predetermined amount.

14. A safety system for pipe lines involving a normally open valve in the pipe line for controlling the flow of fluid therethrough, a motor for closing said valve, means for limiting the amount of torque applicable by said motor to said valve, mechanism responsive to changes of velocity of the fluid flowing through the pipe line adjacent said valve for inducing a valve closing movement of said motor, said mechanism including means for delaying the completion of its operation for inducing said valve closing movement, and means for suspending the valve closing operation of said mechanism when the velocity of the fluid flowing in the pipe line adjacent said valve reaches a predetermined maximum.

15. A safety system for pipe lines involving a normally open valve in the pipe line for controlling the flow of fluid therethrough, a motor for closing said valve, a conduit for supplying fluid to induce a valve closing operation of said motor, a normally closed fluid pressure controlled valve in said conduit, means affording a passage for supplying fluid to effect the opening of said fluid pressure controlled valve, a valve in said passage normally preventing flow of fluid to effect the opening of said fluid pressure controlled valve, mechanism acting when the fluid flowing in the pipe line adjacent said normally open valve attains a predetermined velocity for inducing an opening movement of the valve in said passage, said mechanism including means for delaying the opening of said last named valve after the fluid flowing in the pipe line has attained said predetermined velocity, and means operatively interposed between said last named valve and said fluid pressure controlled valve for delaying the opening of the latter after the valve in said passage has opened.

16. A safety system for pipe lines involving a normally open valve in the pipe line for controlling the flow of fluid therethrough, a motor for closing said valve, a conduit for supplying fluid to induce a valve closing operation of said motor, a normally closed fluid pressure controlled valve in said conduit, a normally open fluid pressure controlled valve in said conduit, means affording a passage permitting a flow of fluid to control the operation of said normally closed fluid pressure controlled valve, said passage means including a tank having an escape vent, means affording a passage permitting a flow of fluid to control the operation of said normally open fluid pressure controlled valve, a plurality of normally closed valves respectively controlling the flow of fluid through said passages, solenoids for respectively inducing the opening of said last named valves, one of said last named valves acting to control the flow of fluid to said tank, differential pressure responsive means including a plurality of liquid containing chambers having a U-tube connection between them and respectively communicating with said pipe line, means effective when the liquid in said chambers reaches a predetermined difference of level to close the circuit containing the solenoid for opening the valve controlling the flow of fluid to said tank, and means effective when the difference of level of the liquid in said chambers has further increased a predetermined amount to close the circuit containing the solenoid for opening the valve controlling the flow of fluid to said normally open valve in said conduit.

17. A safety system for pipe lines involving a valve in the pipe line for controlling the flow of fluid therethrough, a motor for closing said valve, a conduit for supplying fluid to induce a valve closing operation of said motor, a normally closed fluid pressure controlled valve in said conduit, a normally open fluid pressure controlled valve in said conduit, means affording a passage to permit a flow of fluid to induce the opening of said normally closed valve, said passage means including a tank and having a vent therein and being provided with restrictions on opposite sides of said vent, one of said restrictions being disposed between said tank and said vent, means for controlling the flow of fluid through said vent, piping means permitting a flow of fluid to induce the closing of said normally open valve, said piping means having an orifice restriction therein and being provided with a vent, means controlling the flow of fluid through said last named vent, differential pressure responsive means comprising a plurality of liquid containing chambers having a U-tube connection between them and respectively communicating with said pipe line, a float in each of said chambers, means operated by one of said floats when the liquid in said chambers reaches a predetermined difference of level for actuating the means for controlling the flow of fluid through said first named vent, and means operated by the other said float when the difference of level of the liquid in said chambers has further increased a predetermined amount for actuating the means controlling the flow of fluid through said vent of said piping means.

18. A safety system for pipe lines involving a plurality of normally open valves in the pipe line for controlling the flow of fluid therethrough, said valves being disposed at intervals to divide the pipe line into isolable sections, each of said valves being respectively combined with the following instrumentalities, namely, a motor for closing the valve, mechanism responsive to changes of velocity of the fluid flowing through the pipe line adjacent said valve for inducing a valve closing movement of said motor, said mechanism including means for delaying the completion of its operation for inducing said valve closing movement, and means for suspending the valve closing operation of said mechanism when the velocity of the fluid flowing through the pipe line adjacent said valve reaches a predetermined maximum.

GEORGE I. RHODES.